July 9, 1963

A. SCHMIDT 3,097,335

ELECTRIC CURRENT INVERTER

Filed Nov. 18, 1960

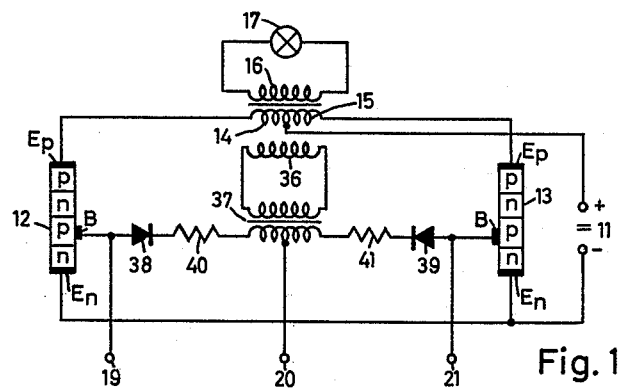
Fig. 11
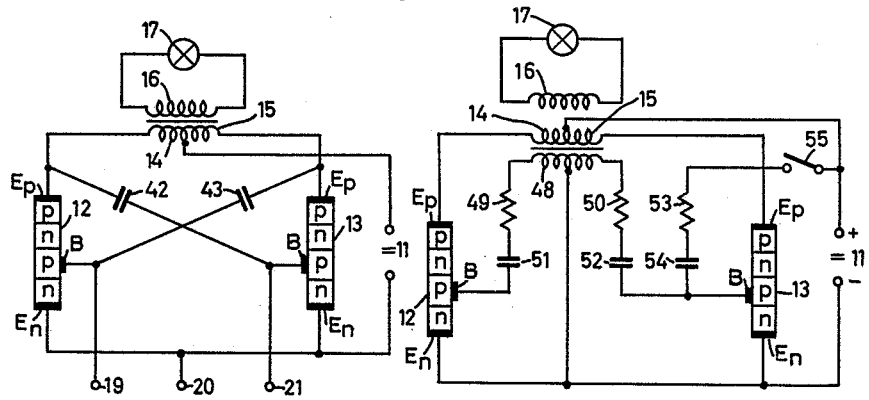
Fig. 12
Fig. 13
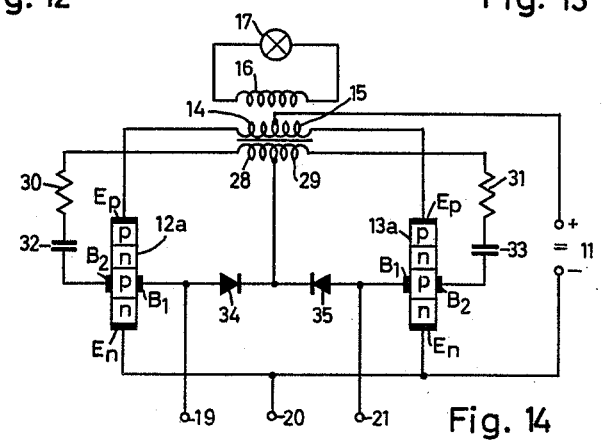
Fig. 14

United States Patent Office 3,097,335
Patented July 9, 1963

3,097,335
ELECTRIC CURRENT INVERTER
Arnold Schmidt, Vienna-Essling, Austria, assignor to Siemens-Schuckertwerke Aktiengesellschaft, Erlangen, Germany, a German corporation
Filed Nov. 18, 1960, Ser. No. 70,258
Claims priority, application Germany Nov. 20, 1959
13 Claims. (Cl. 321—45)

My invention relates to electric current inverters operating with controllable semiconductors p-n junction devices for translating direct current into alternating current.

Such inverters comprise a transformer whose secondary winding supplies the alternating load current, and whose primary winding has a midtap connected to one pole of the direct-current source, the two ends of the primary winding being connected with the other pole of the source through respective controllable p-n junction semiconductor devices. The flow of current in each of the two circuit branches thus extending through the respective semiconductor devices is periodically established and interrupted, in inverse relation to the current flow in the other circuit branch. This is done by means of a driver network or the like source of control voltage which supplies periodic or alternating control signals to the respective gate electrodes of the two semi-conductor devices.

It is known to provide such inverters with transistors whose respective base electrodes are supplied with the above-mentioned gate-control signals. The amount of base current required in such inverters is appreciable, and it is necessary to maintain the flow of gating current during the entire interval of time in which the load current must pass through the particular transistor.

It is also known to provide inverters of the above-mentioned type with four-region semiconductor devices of the p-n-p-n type such as those known as silicon controlled rectifiers. Such four-region junction devices have three electrically sequential p-n junctions of which the two outer or terminal regions of mutually opposed conductance type (n-type and p-type) are connected between one of the respective ends of the transformer primary winding and one pole of the direct-current source, and one of the two intermediate regions of respectively different conductance types is provided with a gate electrode. The control voltage for firing each device is impressed between the gate electrode and the next adjacent terminal electrode to drive a current pulse through the p-n junction between these latter two regions in the forward direction of the semiconductor device. Once a firing pulse is thus supplied, the individual semiconductor device remains conductive and, in the known inverters of this type, can be extinguished only by temporarily reducing the load current substantially to the zero value. Such reduction in load current is effected by means of a commutating capacitor which connects the two ends of the transformer primary winding with each other. The capacitor is charged when current passes through one of the four-region devices, and is discharged through both four-region devices when the other device is switched on by a firing pulse. The resulting current surge is opposed to the load current in the previously conducting four-region device and thus extinguishes the load current. For such operation, the extinguishing current furnished by the capacitor must virtually have the same magnitude, at least for a moment, as the load current. Hence, the commutating capacitor must have a large rating with respect to voltage as well as capacitance. Such large capacitors constitute a considerable disadvantage of this type of inverters.

It is an object of my invention to provide an inverter of the semiconductor type, which greatly minimizes the control current and power required for firing and extinguishing the individual semiconductor devices in the above-described primary circuits of the transformer.

Another, more specific object of my invention is to afford producing the desired inverter operation by firing as well as extinguishing the semiconductor device in each branch of the inverter network by short-lasting pulses rather than by maintaining a continuous gate current during the conducting intervals, while also eliminating the necessity of such large circuit components as the commutating capacitors required for transistor operation.

To this end, and in accordance with a feature of my invention, I provide the midtapped primary circuit of the transformer network with two semiconductor devices of the four-region three-junction type, such as silicon controlled rectifiers, so that the respective two terminal regions of each semiconductor device are connected between one of the two ends of the primary winding and one pole of the direct-current source whose other pole is connected to the midtap of the transformer primary winding; and I further connect to the respective gate electrodes of the two four-region devices a source of gate-control current which provides gating pulse waves of alternately positive and negative polarity to the two gate electrodes so as to pass a cut-off current in the inverse direction (blocking direction) through the p-n junction located between the gate electrode and the next adjacent terminal region of one device, while at the same time passing a firing current in the forward direction through the corresponding p-n junction of the other four-region device.

The invention is based upon the discovery that the current flowing through a four-region semiconductor device can be discontinued by passing through the firing path (gating path) of this device a control current whose direction is opposed to the gating current required for firing the device. As a rule, the firing of a four-region semiconductor device is effected by connecting between one of the two middle regions and the next adjacent outer region a current source with such a polarity that it drives a current in the forward direction of the semiconductor device through the p-n junction formed between the latter two regions. This firing current causes individual charge carriers to be driven toward the blocking p-n junction between the two middle regions of the four-region device, where these charge carriers cause the device to become fired all the way through, with the aid of the load voltage impressed across that p-n junction.

Conversely, when a current pulse in the opposite direction and hence in the blocking or inverse direction of the semiconductor device is passed between the gate electrode and the next adjacent terminal electrode while a load current is passing through the device, such an inverse current pulse through the firing path of the device causes extinction of the load current without the necessity of reducing the load current to zero.

Consequently, the commutating capacitors heretofore necessary for inverters on the basis of four-region semiconductor devices are no longer required, and the expenditure in circuit components as well as in power requirements for controlling the inverter are correspondingly reduced.

An inverter according to the invention also operates at a greatly reduced power requirement than necessary for the control of inverter networks with transistors. This is because the firing pulse, as a rule, is one or two powers of ten smaller than the load current, and an only short-lasting firing pulse is sufficient in an inverter according to the invention as contrasted with the necessity of continuously maintaining the firing current during the entire conducting interval of a transistor.

The cut-off current is an inverter according to the invention, contrary to the firing current, is dependent upon the magnitude of the load current passing through the semiconductor device and, with increasing load current, may have to be greater than the firing current. However, in most cases, the cut-off current is still one to two powers of ten smaller than the load current, and only short cut-off current pulses are sufficient because the four-region device assumes blocking action virtually instantaneously.

The foregoing and other objects, advantages and features of my invention, said features being set forth with particularity in the claims annexed hereto, will be apparent from, and will be mentioned in, the following with respect to the examples of four-region semiconductor devices and the embodiment of inverters according to the invention illustrated by way of example on the accompanying drawings in which:

FIGS. 9 to 14 illustrate schematic circuit diagrams of five different inverters according to the present invention.

Figure 1:
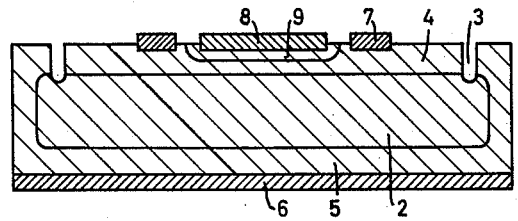
FIGS. 1, 2 and 3 show schematically in cross section and on enlarged scale three examples of four-region semiconductor devices suitable for the purposes of the invention.

The four-region device shown in FIG. 1 is essentially a silicon controlled rectifier with three p-n junctions. It comprises a p-type terminal region 5 in contact with a terminal electrode 6, an n-type terminal region 9 in contact with a terminal electrode 8, and two intermediate n-type and p-type regions 2 and 4 of which the p-type region 4 is provided with a ring-shaped gate electrode 7 concentrically surrounding the circular terminal electrode 8. The entire device has the shape of a circular disc.

The device shown in FIG. 1 can be produced as follows. Used as starting material is a flat, disc-shaped semiconductor body of n-type conductance consisting, for example, of high-ohmic n-silicon (specific electric resistance: rho=100 ohm cm.). The disc, having a diameter of 12 mm. and 250 microns thickness for example, is heated in vacuum in the presence of aluminum. This can be done by placing the disc into an evacuated and subsequently fused-off quartz vessel. By thus heating the disc for about 40 hours at 1200° C., a p-type region is produced whose average doping concentration is in the order of $10^{15}$ atoms per cm.$^3$ and need not be more than $3 \cdot 10^{15}$ atoms per cm.$^3$. This doped region envelops the n-type core portion 2 of the silicon body that remained unaffected by the treatment. By etching a sufficiently deep circular groove 3 into one of the two flat sides of the disc, the p-type region is separated into two parts 4 and 5. Thereafter, thin foils, for example of about 30 microns thickness, consisting of gold alloys which contain the doping material are placed upon the silicon disc. Thus, a foil 6 consisting of gold and containing approximately 0.05% boron is alloyed onto the p-type region 5, whereafter the foil 6 forms one of the terminal electrodes of the four-region device. A circular ring 7 of the same gold-boron material, having an inner diameter of 5 mm. and an outer diameter of 7 mm. is placed onto the p-type region 4 and is also alloyed into the silicon body.

The above-mentioned reference numerals of the alloy-bonded foils are hereinafter, for simplicity, also used for designating the alloyed boundary regions produced in the silicon which also constitute the metallically conducting electrode or terminals of the device.

After completing the alloying operation, the alloyed regions produced by the foils 6 and 7 are bordered by a highly doped p-type zone having a doping concentration of $10^{18}$ per cm.$^3$ or more. This zone is not separately designated on the drawing because it does not differ with respect to conductance type from the adjacent silicon material and since no p-n junction is present between both. A foil disc 8 of about 4 mm. diameter is likewise mounted on this flat side of the silicon disc within the ring 7. The circular foil 8 consists of a gold-antimony alloy comprising approximately 0.5% Sb, the remainder being gold. By alloying this foil together with the silicon, the alloy zone becomes bordered by a highly doped n-type region 9 which forms a p-n junction with the p-type region 4. All above-described alloying processes are preferably performed simultaneously at a temperature somewhat above the melting temperature of the gold-silicon eutectic, this temperature being about 700° C. for example.

Upon completion of the device, it exhibits a p-n-p-n structure. As mentioned, the outer p-type region is contacted by the terminal electrode 6, the outer n-type region by the terminal electrode 8. The middle n-type region 2 does not have any terminal or electrode, whereas the middle p-type region 4 is contacted by a gate electrode 7.

Figure 4:
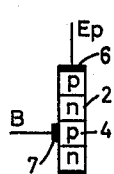
FIGS. 4, 5, 6 and 7 illustrate symbolic representations of such four-region devices to facilitate their comparison with the circuit diagrams shown in the subsequent figures.

The above-described four-region device is schematically illustrated in FIG. 4 by a more or less symbolic illustration of the type used in FIGS. 8 through 14 of this specification. The relation of the various p- and n-type regions and the appertaining terminals or electrodes is indicated in FIG. 4. A positive lead $E_p$ is shown connected to the terminal electrode 6. A negative lead $E_n$ is shown connected to the other terminal electrode 8, and a control lead B is shown connected to the gate electrode 7.

Figure 5:
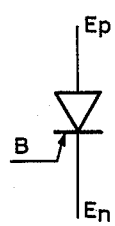

FIG. 5 is a known symbol representing a four-region device of the same type, which is often used in literature and is represented here to facilitate comparing the inverter networks according to the present invention, still to be described, with those to be found in prior art.

Figure 2:
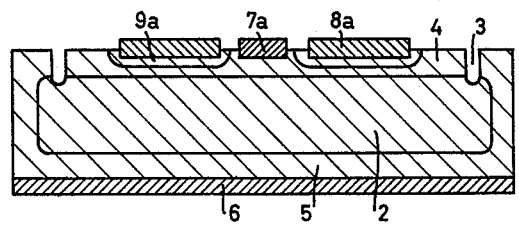

The silicon control rectifier shown in FIG. 2 is similar to the one described above with reference to FIG. 1 except for a modified arrangement of the electrodes on the upper surface of the silicon member. Used for contacting the p-type region 4 is an alloy-bonded gold-boron foil 7a of approximately 2 mm. diameter. Another alloy-bonded gold-antimony foil 8a of about 3 mm. inner diameter and 8 mm. outer diameter is provided for producing an n-type zone 9a. This device is likewise represented by the schematic illustration in FIG. 4 and the symbol in FIG. 5, it being understood that according to FIG. 4, the current lead $E_p$ is connected to the terminal electrode 6 in FIG. 2, the current lead $E_n$ is connected to electrode 8a in FIG. 2, and the control lead B is connected to the gate electrode 7a in FIG. 2.

Figure 3:
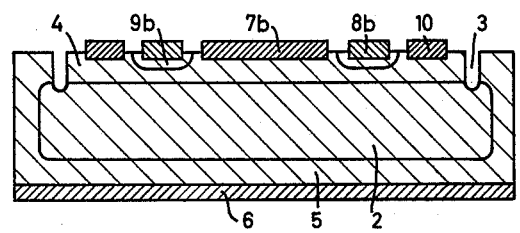

Another suitable silicon controlled rectifier is shown in FIG. 3. The outer n-type region 9b is produced by alloying a gold-antimony foil 8b into the silicon body, this foil having the shape of a circular ring of 5 mm. inner and 7 mm. outer diameter. In contrast to FIGS. 1 and 2, the p-type region 4 is contacted by two electrodes of which one is constituted by a circular disc 7b of about 4 mm. diameter located concentrically within the ring 8b, whereas the other electrode consists of a circular ring 10 of about 8 mm. inner and 10 mm. outer diameter which concentrically surrounds the circular electrode 8b. Both electrodes 7b and 10 are preferably made of the above-mentioned gold-boron material.

Figure 6:
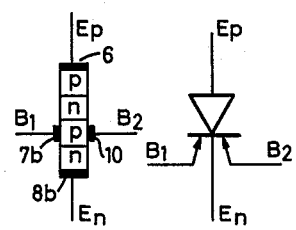
Figure 7:
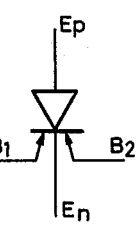

The device according to FIG. 3, with two gate electrodes on the middle p-type region is schematically illustrated in FIG. 6 and symbolically in FIG. 7. The leads $B_1$ and $B_2$ are connected to the respective gate electrodes 7b and 10 of the p-type region 4. The leads $E_p$ and $E_n$ are connected to the terminal electrodes 6 and 8b respectively.

Figure 8:
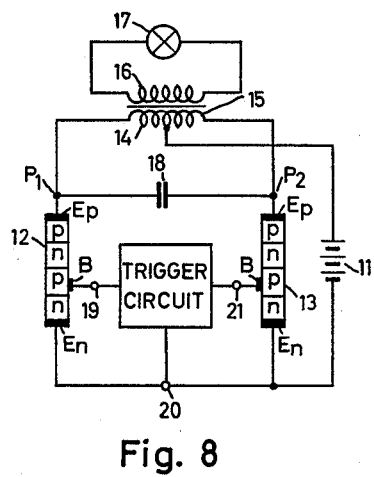
FIG. 8 represents prior art for the purpose of comparison and shows a circuit diagram of an inverter with four-region semiconductor devices interconnected by a commutating capacitor.

Before dealing with the embodiments according to the invention proper, it will be helpful to consider, with reference to FIG. 8, how four-region semiconductor devices, particularly silicon controlled rectifiers, have heretofore been used for current inverting purposes.

As shown in FIG. 8, the source 11 of direct voltage has its positive pole connected to the midtap of the transformer primary winding which comprises two portions 14 and 15 in series. The negative pole of source 11 is connected with the two ends of the primary winding portions 14 and 15 through respective four-region semiconductor devices 12 and 13. The secondary winding 16 is connected to a load 17, for example a fluorescent tube which must be operated with relatively high voltage as compared with the voltage of the direct-voltage source.

A commutating capacitor 18 is connected between the respective terminal connections $E_p$ of the two semiconductor devices. The two control leads B of the respective semiconductor devices are connected to terminals of a source of control current, and the negative lead of source 11 as well as the negative leads $E_n$ of the two semiconductor devices are connected to a neutral or reference terminal 20 of the control-current source. The current source or driver furnishes periodic positive pulses with whose aid the two rectifier devices 12 and 13 are alternately fired.

When the driver passes current from terminals 19 and 20 in the forward direction through the p-n junction located between the leads B and $E_n$ of rectifier 12, this rectifier is fired. A current then flows from the positive pole of the direct-voltage source 11 through the primary winding portion 14 and all four regions of the rectifier 12 to the negative pole of the source 11. Since the four-region device 12 is conducting, the point $P_1$ assumes a potential only slightly different from the negative potential of the source 11. At point $P_2$, however, there occurs a potential of approximately twice the direct voltage, relative to the negative pole of the source and hence relative to the negative terminal leads $E_n$. Consequently, the capacitor 18 is charged. When now, while rectifier 12 carries load current, the driver network fires the rectifier 13 by passing current between terminals 20 and 21 in a manner analogous to that described above, a current will instantaneously flow also through the primary winding portion 15. Consequently, the potential at point $P_2$ is momentarily reduced to approximately the potential of the negative pole of source 11. As a result, the capacitor 18 discharges through both rectifiers 12 and 13. This surge of discharge current is opposed to the load current in the rectifier 12 and therefore reduces the resultant current in this rectifier to zero. Analogously, when during the next following cycle period the rectifier 12 is again fired, the other rectifier 13 is cut-off, and the above-described sequence of operations is repeated. In this manner, an alternating voltage is induced in the secondary winding 16 of the transformer at a frequency determined by that of the driver network.

Figure 9:
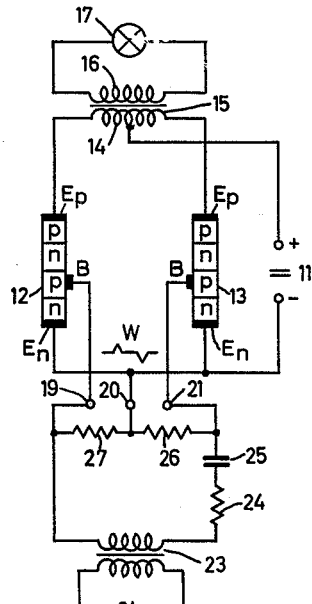

FIG. 9 illustrates one of the simplest embodiments of an inverter according to the invention in a manner readily comparable with the prior-art inverter according to FIG. 8, the same reference numerals being used in both illustrations, as well as in those described hereinafter, for denoting corresponding circuit components respectively.

The inverter network according to FIG. 9 is partly similar to that of FIG. 8 and the performance with respect to firing the respective four-region semiconductor devices is likewise similar to the one described above. However, the inverter according to FIG. 9 differs fundamentally from that of FIG. 8 by eliminating the large commutating capacitor 18 and by providing a driver network or source of control pulses which furnishes not only positive firing pulses but also additional pulses in the opposed direction for extinguishing the respective semiconductor devices. These cut-off pulses must pass in each semi-conductor device 12, 13 through the p-n junction between the leads B and $E_n$ in the blocking (inverse) direction of the rectifier. Consequently, the driver network, for cut-off operation, must periodically connect its source of control current between the terminals 19 and 20 or 20 and 21 with a polarity opposed to that of the currents applied for firing the respective rectifiers. The necessary cut-off pulses in the gating path of each rectifier between the leads B and $E_n$ are of much smaller amplitude than the cut-off pulses which must be supplied by the commutating capacitor in an inverter of the type shown in FIG. 8.

FIG. 9 also shows a pulse generating network suitable as a driver for alternately furnishing positive firing pulses and negative cut-off pulses to the gating path of the respective four-region devices. The driver network comprises a transformer 22 energized at terminals 22 from an alternating current source. This transformer has a saturable core so that the current peaks occur in the saturated portion of the magnetic characteristic. The secondary winding of transformer 23 is connected in series with an R-C member, comprising a resistor 24 and a capacitor 25, which produces pulses of alternately opposed polarities as typified by the pulse wave shown at W. The secondary circuit further comprises a voltage divider composed of two resistors 26 and 27 whose midpoint is connected to the reference terminal 20, whereas the respective potentiometer end points are connected to terminals 19 and 21. The terminal 20 constitutes the neutral or center point for two trains of pulses which are 180° displaced from each other and which appear across terminals 19—20 and 20—21. If desired, the voltage dividers 26 and 27 can be omitted. In this case, the respective pulses occurring across the resistor 24 and the capacitor 25 of the R-C member can be used for simultaneously extinguishing one semiconductor device and firing the other. The amplitude of the pulses thus derived from the two components of the R-C member must then be equal to the greater one of the firing and cut-off pulses required.

While according to FIG. 9, the firing current and the cut-off current are taken from the same source of control current, they may also be supplied from respectively different current sources, or the source of load current may also be used for furnishing the firing and cut-off currents. This will be more fully explained with reference to the embodiments described presently.

When operating with relatively high load currents, the cut-off pulses, as a rule, are appreciably greater than the firing pulses. According to another feature of my invention, therefore, it is preferable in such cases to supply only the firing pulses from the driver while supplying the cut-off pulses from the inverter circuits themselves so as to permit giving the driver a simpler design. This purpose is accomplished by such inverters as exemplified in FIGS. 10, 11 and 12.

Figure 10:
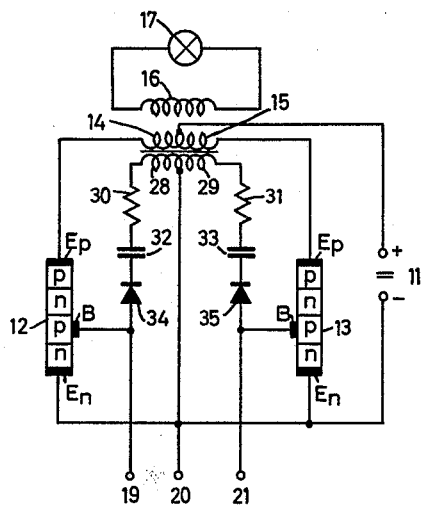

According to FIG. 10, the transformer of the inverter carries an auxiliary secondary winding composed of two portions 28 and 29 which are connected in series with respective R-C members in order to produce cut-off pulses applied to the respective gating paths of the rectifiers between the leads B and $E_n$. For this purpose, the inverter network, otherwise similar to the one shown in FIG. 9 is provided with resistors 30, 31, and capacitors 32, 33. Two diodes 34 and 35 serve to prevent the occurrence of undesired firing pulses which would place an unnecessary load upon the transformer auxiliary windings 28, 29.

In the modified inverter network according to FIG. 11, the cut-off pulses are not produced by R-C members, but by an auxiliary saturable transformer 37. The main transformer of the inverter network is provided with an auxiliary secondary winding 36 which energizes the primary winding of the saturable transformer 37. The cut-off current pulses are induced in the secondary winding of transformer 37 and pass from a midtap to the lead $E_n$ of each rectifier and thence in the blocking (inverse) direction to lead B from which the pulse current flows back to the end of the secondary winding of transformer 37. The occurrence of undesired firing pulses is prevented by correspondingly poled diodes 38 and 39.

Resistors 40 and 41 are added for current limiting purposes.

In the embodiment of FIG. 12, the control lead B of each rectifier is connected with the positive lead $E_p$ of the other rectifier through a capacitor 42 or 43. Each of the capacitors, for example the capacitor 42, is charged when load current flows through one of the rectifiers 13, and is discharged when the other rectifier is fired. The discharge surge passes through the gating path of the first rectifier where it serves as a cut-off pulse. It will be understood that the capacitors 42 and 43 have a much smaller rating than required for a commutating capacitor, because they are only called upon to furnish a current pulse of small magnitude as compared with the load current.

The inverter illustrated in FIG. 13 is completely self-controlled, requiring no extraneous driver for either the firing or the cut-off pulses. The firing and cut-off pulses are produced with the aid of an auxiliary secondary winding 48 on the transformer in coaction with R-C members so that always a firing pulse is supplied to one rectifier simultaneously with a cut-off pulse passing to the other rectifier. The inverter network is provided with resistors 49, 50 and capacitors 51, 52. The inverter operation is started by closing a switch 55 in an auxiliary starting circuit which comprises a resistor 53 and a capacitor 54. A single closing of switch 55 excites the inverter network to oscillations at the frequency determined by the tuning of the R-C members.

In the inverter networks according to the invention so far described, the four-region devices 12, 13 can be substituted by devices of the type illustrated in FIGS. 3, 6 and 7. No fundamental difference exists as to whether for firing and cut-off of the rectifier the control lead $B_1$ or the control lead $B_2$ or both control leads simultaneously are being used. In some cases, it is more favorable to use the lead $B_1$ for firing and the lead $B_2$ for cut-off.

The inverter according to FIG. 14 embodies a particular example involving the use of four-region devices according to FIGS. 3, 6, 7. It has been found that such four-region devices can also be extinguished by passing a transverse current through the device, i.e. a control current whose path is transverse to the path of the load current. This current which enters and leaves the device through the control leads $B_1$ and $B_2$, may likewise have a small magnitude compared with the lead current and may also consist of a pulse. The direction of the transverse current is not critical so that an alternating-current source may also be connected to the two control leads to serve as a source of cut-off current.

The inverter of FIG. 14 corresponds partially to the one described above with reference to FIG. 10, as is apparent from corresponding reference numerals. The essential difference is the fact that each single-gate device 12, 13 of FIG. 10 is substituted in FIG. 14 by a four-region device 12a, 13a with two-gate electrodes in accordance with FIG. 3. This requires a modified interconnection of the individual circuit components. As in the inverters shown in FIGS. 11 and 12, the firing pulses are supplied at terminals 19, 20 and 21. The cut-off pulses are produced by the auxiliary windings 28, 29 of the transformer in coaction with two R-C members 30, 32 and 31, 33. Diodes 34 and 35 prevent short circuiting of the terminals 19 and 21 and for avoiding the occurrence of a cut-off pulse in the wrong four-region device.

It will be understood by those skilled in the art, upon a study of this disclosure, that my invention permits of a variety of modifications and can be given embodiments other than particularly illustrated and described herein, without departing from the essential features of my invention and within the scope of the claims annexed hereto.

I claim:

1. An electric current inverter comprising two direct-current supply leads, a transformer having a secondary winding for providing alternating output voltage and two primary winding portions connected in series so as to have a midpoint and two ends respectively, two four-region three p-n junction semiconductor devices each having two terminal electrodes on respective p-type and n-type terminal regions and a gate electrode on one of the two intermediate regions, said two devices having one of of said terminal electrodes of a given-type region connected with said respective ends and having the other terminal electrode connected with one of said supply leads, said other supply lead being connected with said midpoint, a driver network comprising alternating-pulse generating means and having a reference terminal connected to said one supply lead and two pulse terminals of different instantaneous pulse polarities respectively, said pulse terminals being connected to said two respective gate electrodes to drive a cut-off current in inverse direction through the p-n junction between the gate electrode and the adjacent terminal region of one of said semiconductor devices and simultaneously a firing current in forward direction through the corresponding p-n junction of the other device.

2. An electric current inverter comprising two direct-current supply leads of positive and negative polarities respectively, a transformer having a secondary winding for providing alternating output voltage and a series-connection of two primary winding portions having a common midpoint and two ends respectively, two p-n-p-n semiconductor devices each having a terminal p-region and a terminal n-region and a gate electrode on one of the intermediate regions, one of said terminal regions of each device being connected with the one current-supply lead having the same polarity as said latter region, the other terminal electrode being connected with one of said respective ends, and said other supply lead being connected with said midpoint, a driver network comprising alternating-pulse generating means and having a reference terminal connected to said one supply lead and two pulse terminals of different instantaneous pulse polarities respectively connected to said two respective gate electrodes to drive a cut-off current in inverse direction through the p-n junction between the gate electrode and the adjacent terminal region of one of said semiconductor devices and simultaneously a firing current in forward direction through the corresponding p-n junction of the other device.

3. An electric current inverter comprising two direct-current supply leads of positive and negative polarities respectively, a transformer having a secondary winding for providing alternating output voltage and a series-connection of two primary winding portions having a common midpoint and two ends respectively, two p-n-p-n silicon-controlled rectifiers each having a terminal p-region and a terminal n-region and a gate electrode on the intermediate p-region, said terminal n-regions being connected with said negative supply lead, said terminal p-regions being connected with said two ends respectively, and the positive supply lead being connected with said midpoint, a driver network comprising an alternating-pulse generating means and having a reference terminal connected to said one supply lead and two pulse terminals of different instantaneous pulse polarities respectively connected to said two respective gate electrodes to drive a cut-off current in inverse direction through the p-n junction between the gate electrode and the adjacent terminal region of one of said rectifiers and simultaneously a firing current in forward direction through the corresponding p-n junction of the other rectifier.

4. An electric current inverter comprising two direct-current supply leads of positive and negative polarities respectively, a transformer having a secondary winding for providing alternating output voltage and two primary winding portions with a common midpoint and two ends respectively, two p-n-p-n semiconductor rectifiers each having a terminal p-region and a terminal n-region and a gate electrode on one of the intermediate regions, one of said current-supply leads being connected to the one of said terminal regions of each rectifier having the same polarity as said one lead, said other supply lead being connected with said midpoint, the other terminal electrode of each rectifiers being connected with one of said respective ends, alternating-pulse generating means having a peaked pulse wave with positive and negative pulse durations shorter than the intermediate pauses, said pulse generating means having a reference terminal connected to said one supply lead and two pulse terminals of respectively different instantaneous pulse polarities connected to said two gate electrodes respectively to drive a cut-off current in inverse direction through the p-n junction between the gate electrode and the adjacent terminal region of one of said rectifiers and simultaneously a firing current in forward direction through the corresponding p-n junction of the other rectifier, said pulse currents being both smaller than the load current in each of said rectifiers; whereby said pulse generating means are exclusively active to intermittently cut off said rectifiers at full load current.

5. An electric current inverter comprising two direct-current supply leads of positive and negative polarities respectively, a transformer having a secondary winding for providing alternating output voltage and a series-connection of two primary winding portions with a midpoint and two ends respectively, two p-n-p-n semiconductor devices each having a terminal p-region and a terminal n-region and a gate electrode on one of the intermediate regions, one of said terminal regions of each device being connected with one current-supply lead having the same polarity as said latter region, the other terminal electrode being connected with one of said respective ends, and said other supply lead being connected with said midpoint, a driver network having an auxiliary saturable transformer, a pulse circuit connected to said transformer to be excited therefrom and comprising an R–C member to generate peaked pulses having mutually spaced positive and negative pulse portions, a potentiometer connected in said pulse circuit and having a midtap for reference potential and two pulse terminals to provide two simultaneous signal potentials of different respective polarities, said midtap being connected to said one supply lead and said two pulse terminals being connected to said two gate electrodes respectively to drive a cut-off current in inverse direction through the p-n junction between the gate electrode and the adjacent terminal region of one of said semiconductor devices and simultaneously a firing current in forward direction through the corresponding p-n junction of the other device.

6. In an electric current inverter according to claim 1 wherein a circuit connection extends from said two semiconductor devices through said two primary winding portions, said generating means of said driver network comprising first component pulse generating means for providing the firing-current pulses only, and second component means for providing the cut-off current pulses only, said second component means comprising an electric coupling between each of said gate electrodes and said circuit connection whereby the cut-off pulses are derived from said circuit connection.

7. In an electric current inverter according to claim 6, said coupling comprising another secondary winding inductively linked with said primary winding portion of said transformer and having a midtap-lead and two end leads, said midtap-lead being connected with said one current supply lead, and two R–C members connecting said end-leads with said respective gate electrodes.

8. In an electric current inverter according to claim 6, said coupling comprising another secondary winding inductively linked with said primary winding portion of said transformer, an auxiliary saturable transformer having a primary winding connected with and energized by said other secondary winding, said auxiliary transformer having a secondary with two ends connected to said respective gate electrodes, two diodes of mutually opposed poling interposed between said latter secondary and said respective gate electrodes, said latter secondary having a midtap connected to said one current-supply lead.

9. In an electric current inverter according to claim 6, said coupling comprising another secondary winding inductively linked with said primary winding portion of said transformer, two capacitors of which each is connected between said gate electrode of one of said respective semiconductor devices and said one terminal electrode of the other semiconductor device.

10. In an electric current inverter according to claim 6, said coupling comprising another secondary winding inductively linked with said primary winding portion of said transformer and having a midtap-lead and two end leads, said midtap-lead being connected with said one current supply lead, and two R–C members connecting said end-leads with said respective gate electrodes, a starting circuit extending from one of said gate electrodes to said other current-supply leads and having an R–C member and a normally open starter switch connected with each other, whereby inverter operation is started by temporary closing of said switch.

11. An electric current inverter according to claim 1, comprising a second gate electrode disposed on said one intermediate region of each of said semiconductor devices and transversely spaced from the first-mentioned gate electrode, another secondary winding inductively linked with said primary winding portion of said transformer and having a midtap and two end leads, two R–C members connecting said end leads with said second gate electrode respectively, and two diodes of mutually opposed poling connected between said midtap of said other secondary winding and said respective two pulse terminals.

12. An electric current inverter comprising two direct-current supply leads, a transformer having a secondary winding for providing alternating output voltage and two primary winding portions with a common midpoint and two ends respectively, two four-region three p-n junction semiconductor devices each having two terminal electrodes on respective p-type and n-type terminal regions and two-gate electrodes transversely spaced from each other on one of the intermediate regions, said two devices having one of said terminal electrodes of a given region connected with said respective ends and having the other terminal electrodes connected with one of said supply leads, said other supply lead being connected with said midpoint, firing pulse means having a reference terminal connected to said one supply lead and two pulse terminals of different instantaneous pulse polarities, said pulse terminals being connected to a first one of said two gate electrodes on each of said respective semiconductor devices to supply a firing pulse thereto, and cut-off pulse means connected with said respective other gate electrodes and poled for driving a cut-off current transversely through said one intermediate region, and electric coupling means between said cut-off pulse means and said firing pulse means for synchronizing the cut-off and firing pulses.

13. An electric current inverter comprising two direct-current supply leads, a transformer having a secondary winding for providing alternating output voltage and two primary winding portions with a common midpoint and two ends respectively, two four-region three p-n junction semiconductor devices each having two terminal electrodes on respective p-type and n-type terminal regions and two-date electrodes transversely spaced from each other on one of the intermediate regions, said two devices having one of said terminal electrodes of a given region connected with said respective ends and having the other terminal electrode connected with one of said supply leads, said other supply lead being connected with said midpoint, firing pulse means connected between said one current supply lead and a first one of said gate electrodes on each of said two semiconductor devices for alternately controlling said devices to conduct current, and cut-off pulse means connected between said two first gate electrodes and said other gate electrode for alternately passing cut-off current between the two-gate electrodes of each of said respective devices, whereby conductance in each semiconductor device is intermittently stopped by said cut-off current independently of the load current flowing between said two terminal electrodes of said device.

No references cited.